United States Patent
Song et al.

(10) Patent No.: US 12,195,596 B2
(45) Date of Patent: Jan. 14, 2025

(54) HYPERBRANCHED BORIC ACID MODIFIED PHTHALONITRILE MONOMER AS WELL AS PREPARATION METHOD AND USE THEREOF

(71) Applicants: NINGBO INSTITUTE OF MATERIALS TECHNOLOGY AND ENGINEERING, CHINESE ACADEMY OF SCIENCES, Ningbo (CN); Qianwan Institute of CNITECH, Ningbo (CN)

(72) Inventors: Yujie Song, Ningbo (CN); Ming Liu, Ningbo (CN); Muyao Gao, Ningbo (CN)

(73) Assignees: NINGBO INSTITUTE OF MATERIALS TECHNOLOGY AND ENGINEERING, CHINESE ACADEMY OF SCIENCES, Ningbo (CN); Qianwan Institute of CNITECH, Ningbo (CN)

( * ) Notice: Subject to any disclaimer, the term of this patent is extended or adjusted under 35 U.S.C. 154(b) by 0 days.

(21) Appl. No.: 18/709,037

(22) PCT Filed: Oct. 31, 2022

(86) PCT No.: PCT/CN2022/128579
§ 371 (c)(1),
(2) Date: May 10, 2024

(87) PCT Pub. No.: WO2023/083035
PCT Pub. Date: May 19, 2023

(65) Prior Publication Data
US 2024/0327579 A1    Oct. 3, 2024

(30) Foreign Application Priority Data

Nov. 10, 2021   (CN) .......................... 202111329850.2

(51) Int. Cl.
*C08G 79/08*    (2006.01)
*C07F 5/04*     (2006.01)

(52) U.S. Cl.
CPC ............... *C08G 79/08* (2013.01); *C07F 5/04* (2013.01)

(58) Field of Classification Search
USPC .......................................................... 528/362
See application file for complete search history.

(56) References Cited

U.S. PATENT DOCUMENTS

| | | |
|---|---|---|
| 5,237,045 A | 8/1993 | Burchill et al. |
| 8,962,890 B1 | 2/2015 | Tan et al. |

FOREIGN PATENT DOCUMENTS

| | | |
|---|---|---|
| CN | 103289089 A | 9/2013 |
| CN | 110483763 A | 11/2019 |
| CN | 113968878 A | 1/2022 |

OTHER PUBLICATIONS

MIL-STD-2031(SH), Fire and Toxicity Test Methods and Qualification Procedure for Composite Material Systems Used in Hull, Machinery, and Structural Applications Inside Naval Submarines, Department of Defense Test Method Standard, 1991, pp. 1-54.

*Primary Examiner* — Terressa Boykin
(74) *Attorney, Agent, or Firm* — Bayramoglu Law Offices LLC

(57) ABSTRACT

A hyperbranched boric acid modified phthalonitrile monomer as well as a preparation method and use thereof are provided. The preparation method of the hyperbranched boric acid modified phthalonitrile monomers includes: a reaction in the mixture containing a boron source, a phenol compound, and a solvent to prepare a compound with a B—O structure; and a reaction in the mixture containing the compounds with the B—O structure, 4-nitrophthalonitrile, a catalyst, and a solvent to prepare the hyperbranched boric acid modified phthalonitrile monomers. The hyperbranched boric acid modified phthalonitrile monomers prepared in the present application can be dissolved into multiple organic solvents, thus improving the processability of the phthalonitrile monomers; meanwhile, a modified phthalonitrile resin prepared from the phthalonitrile monomers has excellent high-temperature resistance and ablation resistance, and has broad application prospects in the fields of aerospace, warship submarines, electronic packaging and the like.

19 Claims, 2 Drawing Sheets

HYPERBRANCHED BORIC ACID MODIFIED PHTHALONITRILE MONOMER AS WELL AS PREPARATION METHOD AND USE THEREOF

CROSS REFERENCE TO THE RELATED APPLICATIONS

This application is the national phase entry of International Application No. PCT/CN2022/128579, filed on Oct. 31, 2022, which is based upon and claims priority to Chinese Patent Application No. 202111329850.2, filed on Nov. 10, 2021, the entire contents of which are incorporated herein by reference.

TECHNICAL FIELD

The present application belongs to the technical fields of composites, and particularly relates to a hyperbranched boric acid modified phthalonitrile monomer as well as a preparation method and use thereof.

BACKGROUND

A phthalonitrile resin is a high-temperature resistant resin which was developed by Keller and his team from the US Navy Laboratory in the 1980s. An addition reaction between cyano groups in monomers produces this thermoset resin, as shown in FIG. 1. Compared with other common high-temperature resistant resins, the phthalonitrile resin exhibits excellent high-temperature stability after undergoing proper heat treatment. Temperature of 5% weight loss ($T_{d5\%}$) can reach 500° C., glass transition temperature is over 400° C., and long-term use temperature is up to 372° C. The addition reaction does not generate byproducts in the curing stage, and the obtained resin is dense in structure and good in structure stability. The polymer has good mechanical properties, excellent high-temperature resistance, and low water absorption. The phthalonitrile resin has the characteristics of fire retardancy, low toxicity, and no smoke during burning, which make it a unique refractory special polymer material meeting US Military Standard (MIL-STD-2031), and can be applied to the fields of aerospace, ships and warships, microelectronics, mechanical manufacturing and the like.

SUMMARY

The main objective of the present application is to provide a hyperbranched boric acid modified phthalonitrile monomer as well as a preparation method and use thereof to overcome the defects in the prior art.

To achieve the above objective of the present disclosure, the technical solution adopted by the present application is as follows:

The embodiments of the present application provide a hyperbranched boric acid modified phthalonitrile monomer, the phthalonitrile monomer has a structure represented by formula (I):

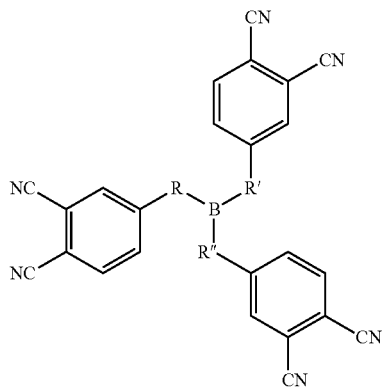

wherein R, R', and R" are all independently selected from aromatic structures.

The embodiments of the present application also provide a preparation method of the above hyperbranched boric acid modified phthalonitrile monomer, comprising:
reacting a first mixed reaction system containing a boron source, a phenol compound, and a solvent to prepare a compound with a B—O structure; and
reacting a second mixed reaction system containing the compound with the B—O structure, 4-nitrophthalonitrile, a catalyst, and a solvent to prepare the hyperbranched boric acid modified phthalonitrile monomer.

The embodiments of the present application also provide a preparation method of a modified phthalonitrile resin, comprising:
providing the above hyperbranched boric acid modified phthalonitrile monomer; and
subjecting the phthalonitrile monomer and a phthalonitrile curing agent to a curing reaction to prepare the modified phthalonitrile resin.

The embodiments of the present application also provide the modified phthalonitrile resin prepared by the above method.

The embodiments of the present application also provide use of the hyperbranched boric acid modified phthalonitrile monomer or the modified phthalonitrile resin in the fields of aerospace, ships and warships, microelectronics, or mechanical manufacturing.

Compared with the prior art, the present application has the beneficial effects:
(1) a hyperbranched B—O structure is first introduced in the phthalonitrile monomer, and the synthesis method is simple and universal;
(2) the hyperbranched boric acid modified phthalonitrile monomer prepared in the present application can be dissolved into common organic solvents, thereby improving the processability of the phthalonitrile monomers;
(3) the structure of hyperbranched boric acid or a derivative thereof is introduced into the phthalonitrile monomer, so the introduction of the boron element improves the ablation resistance and high-temperature resistance of the resin.

BRIEF DESCRIPTION OF THE DRAWINGS

To more clearly illustrate the embodiments of the present application or the technical solution in the prior art, drawings required to be used in the embodiments or the description in the prior art will be simply introduced. Obviously, the drawings described below are only some embodiments in the present application, and other drawings can also be obtained by persons of ordinary skill in the art without creative efforts according to these drawings.

DETAILED DESCRIPTION OF THE EMBODIMENTS

Figure 1:
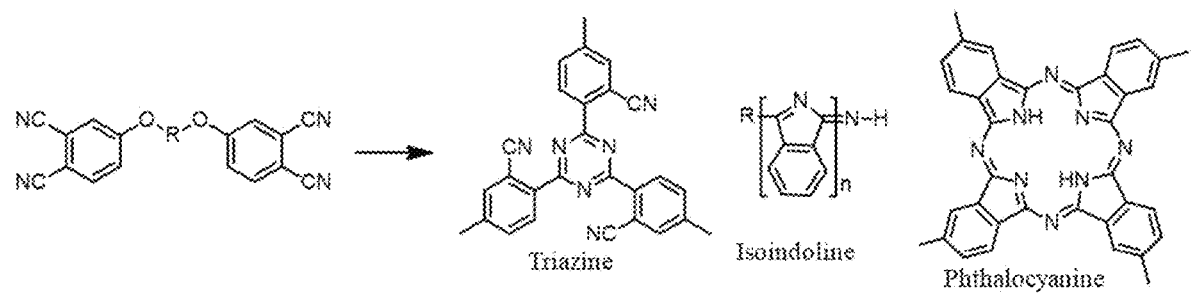
FIG. 1 is a diagram showing that a phthalonitrile monomer in the prior art of the present application is cross-linked through an addition reaction of cyan to obtain a thermosetting resin.

In view of the defects in the prior art, the inventor of this case proposes the technical solution of the present application through long-term research and extensive practice. Next, the technical solution of the present application will be clearly and completely described, obviously, the described embodiments are some embodiments of the present application, but not all the embodiments. Based on the embodiments of the present application, other embodiments obtained by persons of ordinary skill in the art without creative efforts are all included in the scope of protection of the present application.

Specifically, one aspect of the technical solutions of the present application provides a hyperbranched boric acid modified phthalonitrile monomer, which has a structure represented by formula (I):

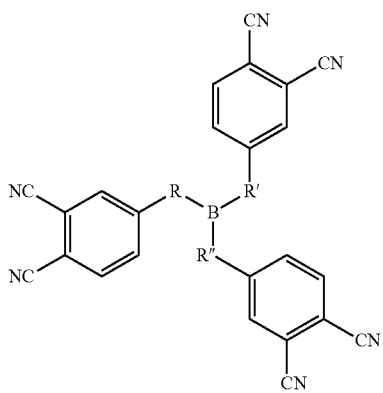

wherein R, R', and R" are all independently selected from aromatic structures.

Further, the aromatic structure comprises benzene rings and/or aromatic ether and is not limited thereto.

In some preferred embodiments, the phthalonitrile monomer has a structure represented by formula (II):

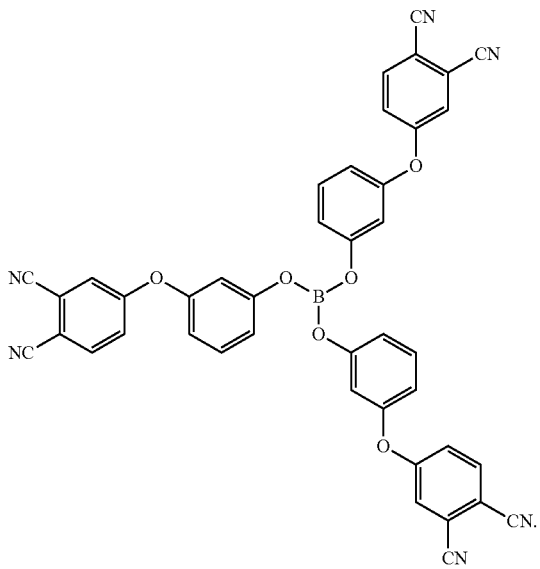

Further, the molecular structure of the phthalonitrile monomer contains a structure of hyperbranched boric acid or a derivative thereof.

Another aspect of the embodiments of the present application also provides a preparation method of the above hyperbranched boric acid modified phthalonitrile monomer, comprising:

reacting a first mixed reaction system containing a boron source, a phenol compound, and a solvent to prepare a compound with a B—O structure; and reacting a second mixed reaction system containing the compound with the B—O structure, 4-nitrophthalonitrile, a catalyst, and a solvent to prepare the hyperbranched boric acid modified phthalonitrile monomer.

In some preferred embodiments, the preparation method specifically comprises: mixing a phenol compound with a first solvent, then adding the boron source under a protective atmosphere to form the first mixed reaction system, and reacting the first mixed reaction system for 3 h at 100-160° C., to prepare the compound with the B—O structure.

In some preferred embodiments, the preparation method specifically comprises: mixing the compound with the B—O structure with the solvent, then adding 4-nitrophthalonitrile and a catalyst to form the second mixed reaction system, and reacting the second mixed reaction system for 12-18 h under the protective atmosphere and at 30-80° C., to prepare the hyperbranched boric acid modified phthalonitrile monomer.

In some preferred embodiments, the boron source comprises boric acid and/or phenylboronic acid and is not limited thereto.

Further, the phenol compound comprises a combination of any one or more than two of resorcinol, phloroglucinol, bisphenol A, bisphenol-F, or 1,3,5-pyrogallol, and is not limited thereto.

Further, the catalyst comprises a basic catalyst and is not limited thereto.

Furthermore, the basic catalyst comprises potassium carbonate and is not limited thereto.

Further, the solvent comprises N-methylpyrrolidone and is not limited thereto.

In some preferred embodiments, the molar ratio of the boron source to the phenol compound is 10:1-1:10.

Further, the molar ratio of the compound with the B—O structure to 4-nitrophthalonitrile to the catalyst is 1:(1-4):(1-4).

Another aspect of the embodiments of the present application also provides a preparation method of a modified phthalonitrile resin, comprising:

providing the above hyperbranched boric acid modified phthalonitrile monomer; and subjecting the phthalonitrile monomer and a phthalonitrile curing agent to a curing reaction to prepare the modified phthalonitrile resin.

In some preferred embodiments, the phthalonitrile curing agent comprises a combination of any one or more than two of an organic amine curing agent, a phenolic curing agent, a strong organic acid curing agent, a strong organic acid/ammonium salt curing agent, a metal salt curing agent and a metal curing agent, and is not limited thereto.

Further, the organic amine curing agent comprises a combination of any one or more than two of a 4,4'-(1,4-phenylphenoxy) dianiline curing agent, 4,4'-bis(4-aminophenoxy) diphenyl sulfone, 4,4'-bis(3-aminophenoxy) diphenyl sulfone and 4,4'-diaminodiphenyl sulfone, and is not limited thereto.

In some preferred embodiments, the preparation method specifically comprises: mixing the phthalonitrile monomer with the phthalonitrile curing agent and performing a curing reaction at 150-600° C.

In some more specific embodiments, the compound with the B—O structure is prepared by reacting boron acid with a phenol compound.

Further, boron acid and resorcinol are fed in with a molar ratio of 10:1-1:10, N-methylpyrrolidone (NMP) is used as a solvent, and the above materials react for 3 h at 100-160° C. at an inert atmosphere, to obtain the compound with the B—O structure.

In some more specific embodiments, the hyperbranched boric acid modified phthalonitrile monomers are prepared by reacting the compound with the B—O structure with 4-nitrophthalonitrile, and a boron source is introduced into the phthalonitrile monomer.

Further, potassium carbonate is used as a basic catalyst, N-methylpyrrolidone and the like are used as solvents, the compound with the B—O structure (the compound with the B—O structure contains a —OH structure) and 4-nitrophthalonitrile are used as raw materials and react for 12-18 h at 30-80° C. at an inert atmosphere to obtain a phthalonitrile monomer with a hyperbranched B—O structure (i.e., "hyperbranched boric acid modified phthalonitrile monomer" as described above).

In some more specific embodiments, the modified phthalonitrile resin is obtained by mixing the phthalonitrile monomer containing the hyperbranched B—O structure with a phthalonitrile curing agent for curing at certain conditions.

Further, the curing condition of the phthalonitrile resin is gradient heating from 150° C. to 600° C.

Another aspect of the embodiments of the present application also provides the modified phthalonitrile resin prepared by the above method.

In the present application, the phthalonitrile monomer can be dissolved into common solvents, such as tetrahydrofuran, N,N-dimethylformamide, dimethyl sulfoxide, acetone, dichloromethane, N-methylpyrrolidone, and other solvents, and has good processing property; the prepared resin without high-temperature curing has heat stability ($T_{d5\%}$=411° C.), and a carbon residue rate at 1000° C. is 45.68%. The thermal-oxidative stability $T_{5\%}$=411° C. shows the resin has good heat resistance, a low heat release peak value, and a small total heat release, indicating that the modified phthalonitrile resin has good ablation resistance.

In the present application, the boron element in the modified phthalonitrile resin forms a thermal insulation protecting layer on the surface of carbide in the process of pyrolysis, the boron atom attracts electrons from an adjacent carbon atom in the process of pyrolysis due to its electron-deficient property, leading to breakage of a covalent bond between the carbon atom and a rearranged carbon skeleton structure. As a result, amorphous carbon is transformed into a more ordered graphite carbon structure, thereby reducing the thermal cracking rate of the resin.

Another aspect of the embodiments of the present application also provides use of the above hyperbranched boric acid modified phthalonitrile monomer or the modified phthalonitrile resin in the fields of aerospace, ships and warships, microelectronics or mechanical manufacturing.

Next, the technical solution of the present application will be further described in detail in combination with several preferred embodiments and drawings, these embodiments are implemented on the basis of the technical solution of the present disclosure, detailed embodiments, and specific operation processes are given, however, the scope of protection of the present application is not limited by the following examples.

Experimental materials used in the examples below, unless specified otherwise, are all purchased from conventional biochemical reagent companies.

Example 1

In this example, a phthalonitrile monomer was prepared by using boric acid, resorcinol, and a 4-nitrophthalonitrile monomer as raw materials. These raw materials were all commercially available. The preparation method was as follows:
(1) 33.033 g of resorcinol (0.3 mol) was added into 150 mL of NMP, and dissolved by stirring at 60° C.;
(2) $N_2$ was introduced for purging;
(3) 6.183 g of boric acid (0.1 mol) was added, and the above materials reacted for 3 h at 100° C. in the atmosphere of $N_2$;
(4) 55.28 g of $K_2CO_3$ (0.4 mol) and 17.313 g of 4-nitrophthalonitrile (0.1 mol) were subsequently added to the system, and reacted for 18 h at 30° C. in the atmosphere of $N_2$;
(5) impurities in the system were removed by washing;
(6) the product was dried for 12 h at 80° C. in an oven to obtain a powdered sample, i.e., a hyperbranched boric acid modified phthalonitrile monomer.

Example 2

In this example, a phthalonitrile monomer was prepared by using boric acid, resorcinol, and a 4-nitrophthalonitrile monomer as raw materials. These raw materials were all commercially available. The preparation method was as follows:
(1) 33.033 g of resorcinol (0.3 mol) was added into 150 mL of NMP, and dissolved by stirring at 60° C.;
(2) $N_2$ was introduced for purging;
(3) 6.183 g of boric acid (0.1 mol) was added, and the above materials reacted for 3 h at 130° C. in the atmosphere of $N_2$;

(4) 49.754 g of $K_2CO_3$ (0.36 mol) and 69.252 g of 4-nitrophthalonitrile (0.4 mol) were subsequently added to the system, and reacted for 15 h at 50° C. in the atmosphere of $N_2$;
(5) impurities in the system were removed by washing;
(6) the product was dried for 12 h at 80° C. in an oven to obtain a powdered sample, i.e., a hyperbranched boric acid modified phthalonitrile monomer.

Example 3

In this example, a phthalonitrile monomer was prepared by using boric acid, resorcinol, and a 4-nitrophthalonitrile monomer as raw materials. These raw materials were all commercially available. The preparation method was as follows:
(1) 33.033 g of resorcinol (0.3 mol) was added into 150 mL of NMP, and dissolved by stirring at 60° C.;
(2) $N_2$ was introduced for purging;
(3) 6.183 g of boric acid (0.1 mol) was added, and the above materials reacted for 3 h at 160° C. in the atmosphere of $N_2$ to obtain tri-(3-hydroxyphenyl) borate, and the reaction equation is as follows:

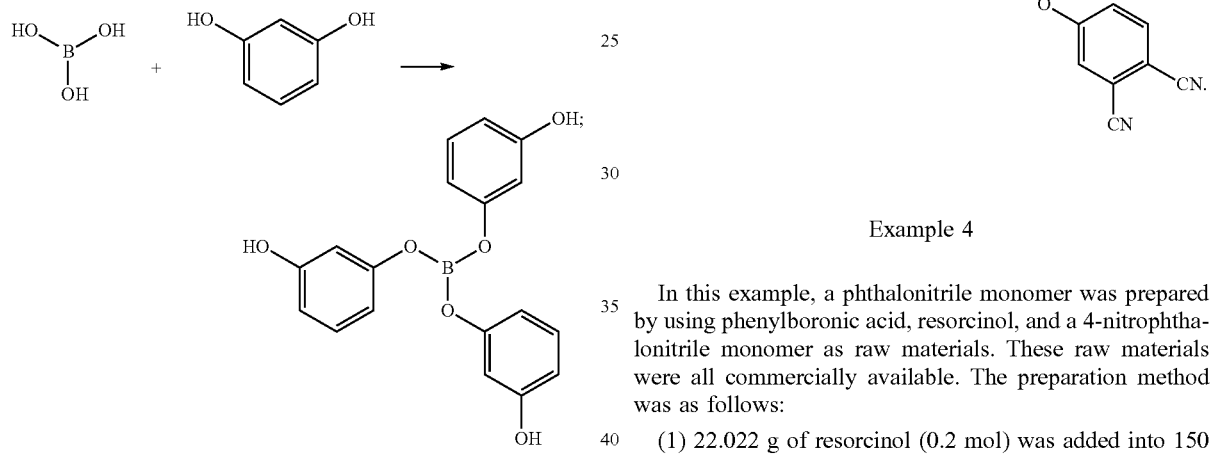

(4) 49.754 g of $K_2CO_3$ (0.36 mol) and 51.939 g of 4-nitrophthalonitrile (0.3 mol) were subsequently added to the system, and reacted for 12 h at 80° C. in the atmosphere of $N_2$;
(5) impurities in the system were removed by washing;
(6) the product was dried for 12 h at 80° C. in an oven to obtain dark green powders, i.e., a hyperbranched boric acid modified phthalonitrile monomer (the solubility of the monomer is as shown in Table 1), and the reaction equation is as follows:

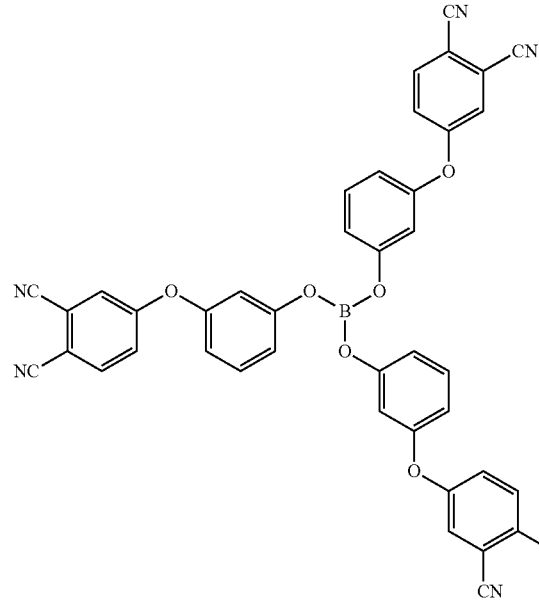

Example 4

In this example, a phthalonitrile monomer was prepared by using phenylboronic acid, resorcinol, and a 4-nitrophthalonitrile monomer as raw materials. These raw materials were all commercially available. The preparation method was as follows:
(1) 22.022 g of resorcinol (0.2 mol) was added into 150 mL of NMP, and dissolved by stirring at 60° C.;
(2) $N_2$ was introduced for purging;
(3) 12.193 g of phenylboronic acid (0.1 mol) was added, and the above materials reacted for 3 h at 120° C. in the atmosphere of $N_2$ to obtain di-(3-hydroxyphenyl) phenylborate;

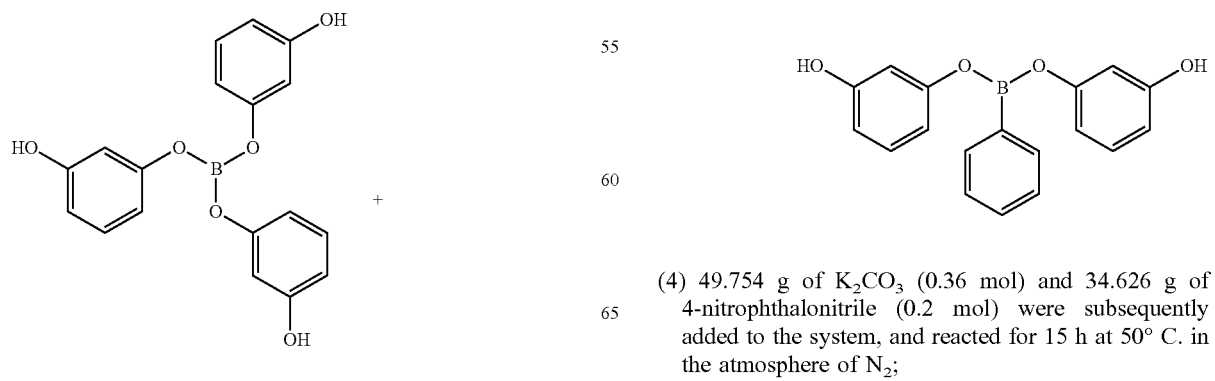

(4) 49.754 g of $K_2CO_3$ (0.36 mol) and 34.626 g of 4-nitrophthalonitrile (0.2 mol) were subsequently added to the system, and reacted for 15 h at 50° C. in the atmosphere of $N_2$;

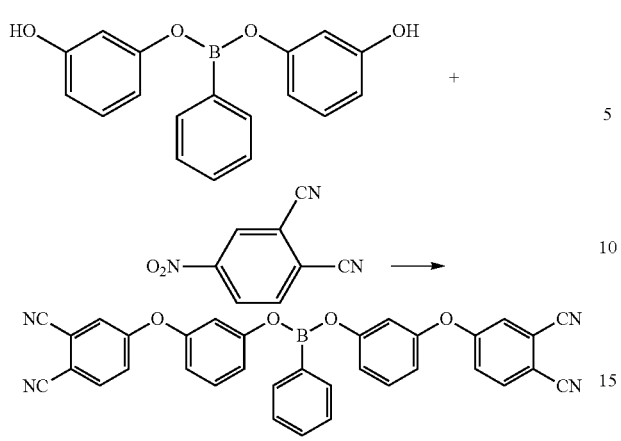

(5) impurities in the system were removed by washing;
(6) the product was dried for 12 h at 80° C. in an oven to obtain a powdered sample, i.e., a hyperbranched boric acid modified phthalonitrile monomer, and the solubility of the monomer is as shown in Table 1.

Performance Characterization

TABLE 1

Solubility of phthalonitrile monomers prepared in examples 3 and 4 in common organic solvents

| Phthalonitrile monomer | Solubility | | | | |
| --- | --- | --- | --- | --- | --- |
| | NMP | DMF | DMSO | THF | acetone |
| Example 3 | + | + | + | + | + |
| Example 4 | + | + | + | + | + |

Note:
"+" represents "soluble"

Example 5

In this example, a phthalonitrile monomer was prepared by using phenylboronic acid, resorcinol, and a 4-nitrophthalonitrile monomer as raw materials. These raw materials were all commercially available. The preparation method was as follows:
(1) 22.022 g of resorcinol (0.2 mol) was added into 150 mL of NMP, and dissolved by stirring at 60° C.;
(2) N$_2$ was introduced for purging;
(3) 12.193 g of phenylboronic acid (0.1 mol) was added, and the above materials reacted for 3 h at 120° C. in the atmosphere of N$_2$;
(4) 13.821 g of K$_2$CO$_3$ (0.1 mol) and 34.626 g of 4-nitrophthalonitrile (0.2 mol) were subsequently added to the system, and reacted for 15 h at 50° C. in the atmosphere of N$_2$;
(5) impurities in the system were removed by washing;
(6) the product was dried for 12 h at 80° C. in an oven to obtain a powdered sample, i.e., a hyperbranched boric acid modified phthalonitrile monomer.

Performance Characterization

Figure 2:
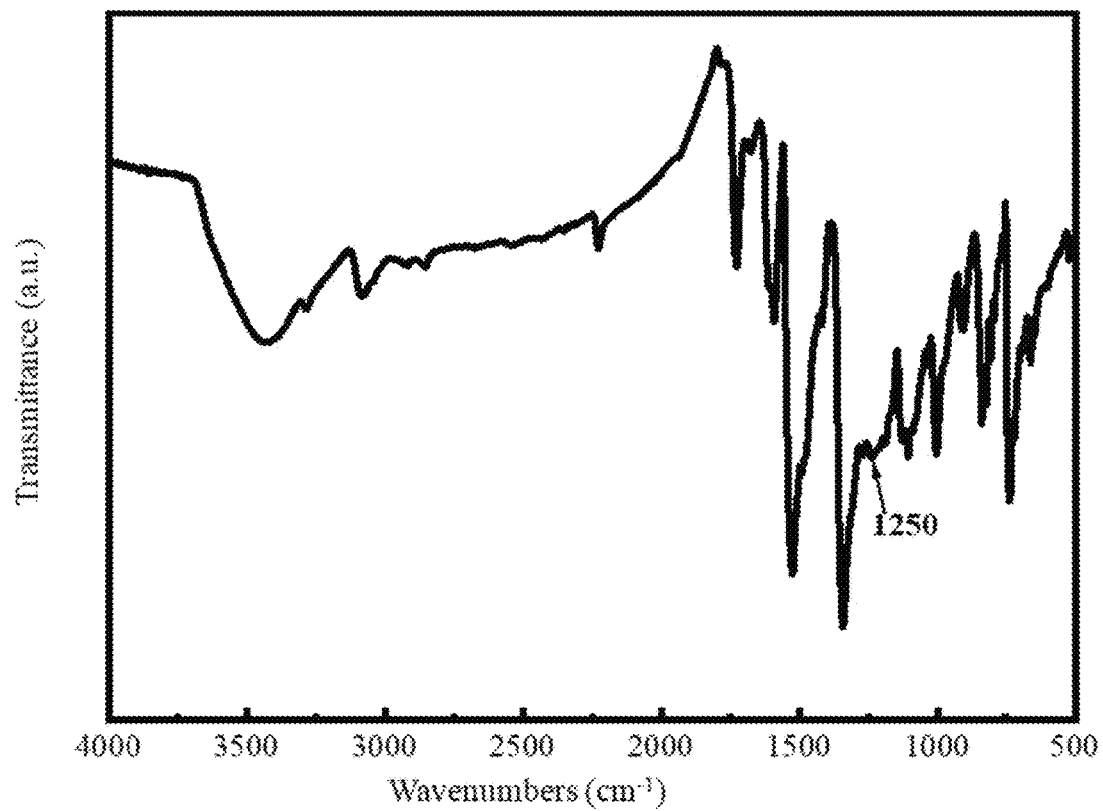
FIG. 2 is a Fourier Transform Infrared Spectroscopy (FTIR) image of a hyperbranched modified phthalonitrile monomer prepared in example 3 of the present application.

FIG. 1 is a diagram showing that a phthalonitrile monomer in the prior art of the present application is cross-linked through the addition reaction of cyan to obtain a thermosetting resin;

FIG. 2 shows FTIR structure characterization of a hyperbranched boric acid modified phthalonitrile monomer prepared in example 3, with a newly generated peak of 1250 cm$^{-1}$ for an aryl ether bond, indicating that a phthalonitrile monomer with a hyperbranched boric acid structure is successfully prepared.

Figure 3:
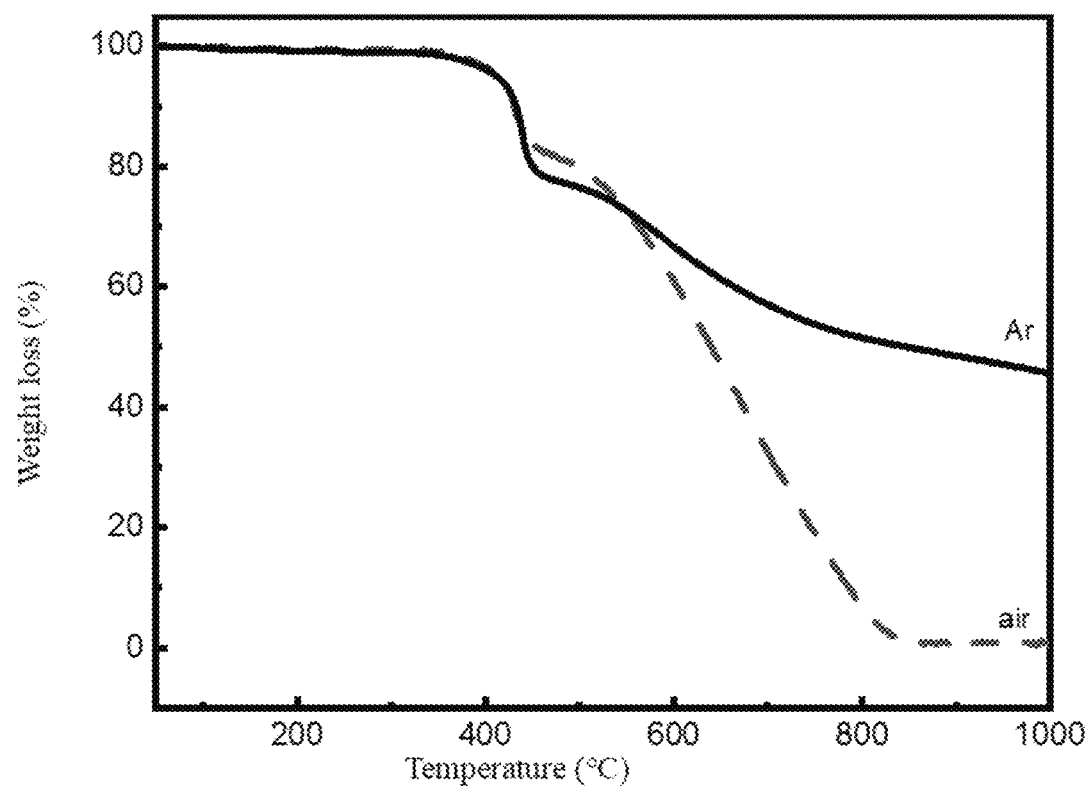
FIG. 3 is a Thermo Gravimetric Analysis (TGA) graph of a modified phthalonitrile resin prepared in example 5 of the present application.

FIG. 3 shows the TGA results of a modified phthalonitrile resin prepared in example 5, which shows that for the resin, $T_{5\%}=413°$ C. in the atmosphere of air, and $T_{5\%}=411°$ C. at the inter atmosphere, indicating that the novel modified phthalonitrile resin has good thermal stability.

Figure 4:
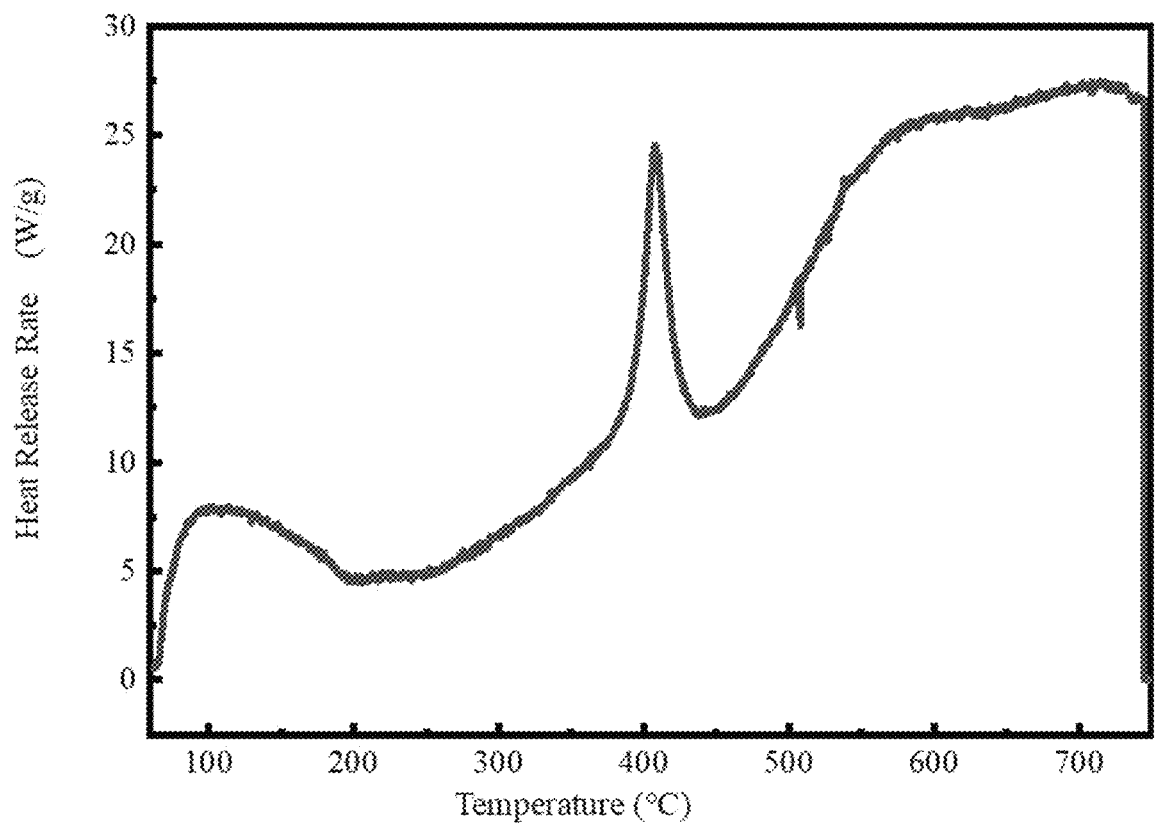
FIG. 4 is a PCFC curve chart of a modified phthalonitrile resin prepared in example 5 of the present application.

FIG. 4 shows a PCFC curve of a modified phthalonitrile resin prepared in example 5, which shows the resin has a low heat release peak value and small total heat release, indicating that the modified phthalonitrile resin has good ablation resistance.

Example 6

In this example, a phthalonitrile monomer was prepared by using phenylboronic acid, bisphenol A, and a 4-nitrophthalonitrile monomer as raw materials. These raw materials were all commercially available. The preparation method was as follows:
(1) 68.04 g of bisphenol A (0.3 mol) was added into 150 mL of NMP, and dissolved by stirring at 60° C.;
(2) N$_2$ was introduced for purging;
(3) 12.193 g of phenylboronic acid (0.1 mol) was added, and the above materials reacted for 3 h at 120° C. in the atmosphere of N$_2$;
(4) 49.754 g of K$_2$CO$_3$ (0.36 mol) and 34.626 g of 4-nitrophthalonitrile (0.4 mol) were subsequently added to the system, and reacted for 15 h at 50° C. in the atmosphere of N$_2$;
(5) impurities in the system were removed by washing;
(6) the product was dried for 12 h at 80° C. in an oven to obtain a powdered sample, i.e., a hyperbranched boric acid modified phthalonitrile monomer.

Example 7

The hyperbranched boric acid modified phthalonitrile monomer in this example was prepared in example 3, and a modified phthalonitrile resin was prepared by mixing the hyperbranched boric acid modified phthalonitrile monomer with a curing agent. The specific method is as follows:
4 g of hyperbranched boric acid modified phthalonitrile monomer and 0.4 g of 4,4'-bis(4-aminophenoxy) diphenyl sulfone curing agent were dissolved into 15 mL of acetone and uniformly mixed, and then the redundant solvent was removed; then the mixed system was placed in a mold, the mold was put in a vacuum oven, and the remaining solvent was removed;
the mixed system was subjected to curing treatment based on a curing process, i.e., 150° C. for 2 h; 180° C. for 2 h; 220° C. for 2 h; 260° C. for 2 h; 280° C. for 2 h, so as to obtain the modified phthalonitrile resin.

Example 8

The hyperbranched boric acid modified phthalonitrile monomer in this example was prepared in example 3, and a modified phthalonitrile resin was prepared by mixing the hyperbranched boric acid modified phthalonitrile monomer with a curing agent. The specific method is as follows:
4 g of hyperbranched boric acid modified phthalonitrile monomer and 0.4 g of 4,4'-(1,4-phenyldioxy) dianiline curing agent were dissolved into 15 mL of acetone and uniformly mixed, and then the redundant solvent was removed; then a mixed system was placed in a mold, the mold was put in a vacuum oven, and the remaining solvent was removed;

the mixed system was subjected to curing treatment based on a curing process, i.e., 150° C. for 2 h; 180° C. for 2 h; 220° C. for 2 h; 260° C. for 2 h; 280° C. for 2 h, so as to obtain the modified phthalonitrile resin.

In conclusion, the novel monomer prepared in the present application has good solubility compared with the existing phthalonitrile monomer. The obtained modified phthalonitrile resin has the advantages of high-temperature resistance and ablation resistance.

In addition, the inventor of this case conducted tests with reference to the above examples based on other raw materials, process operations and process conditions involved in the specification, and obtained ideal results.

It should be understood that the technical solutions of the present application are not limited to the above specific embodiments, the technical deformations made according to the technical solutions of the present application without departing from the purpose of the present application and scope appended by claims are all included within the scope of protection of the present application.

What is claimed is:

1. A hyperbranched boric acid modified phthalonitrile monomer, wherein the hyperbranched boric acid modified phthalonitrile monomer has a structure represented by formula (I):

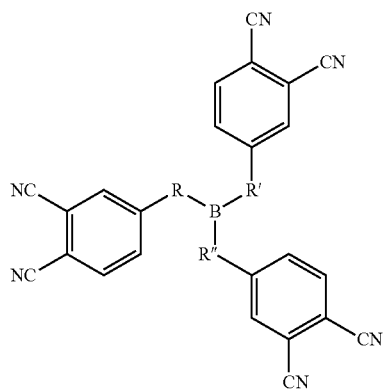

(I)

wherein R, R', and R" are all independently selected from an aromatic structure.

2. The hyperbranched boric acid modified phthalonitrile monomer according to claim 1, wherein the aromatic structure comprises a benzene ring and/or an aromatic ether.

3. The hyperbranched boric acid modified phthalonitrile monomer according to claim 2, the hyperbranched boric acid modified phthalonitrile monomer has a structure represented by formula (II):

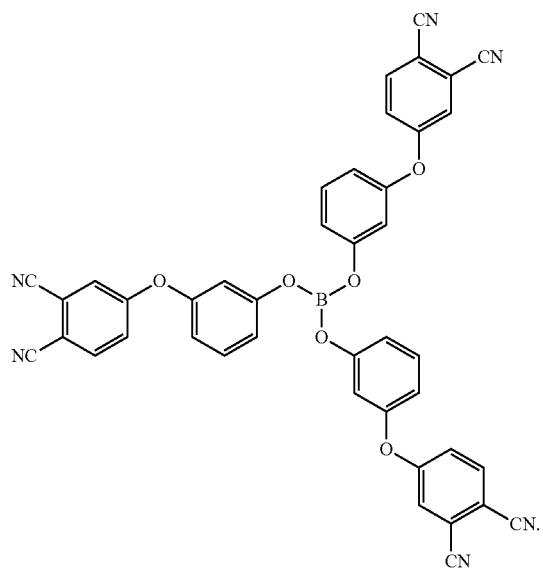

(II)

4. A preparation method of the hyperbranched boric acid modified phthalonitrile monomer according to claim 1, comprising:
   reacting a first mixed reaction system containing a boron source, a phenol compound, and a first solvent to prepare a compound with a B—O structure; and
   reacting a second mixed reaction system containing the compound with the B—O structure, 4-nitrophthalonitrile, a catalyst, and a second solvent to prepare the hyperbranched boric acid modified phthalonitrile monomer.

5. The preparation method according to claim 4, comprising: mixing the phenol compound with the first solvent, then adding the boron source under a protective atmosphere to form the first mixed reaction system, and reacting the first mixed reaction system for 3 h at 100-160° C., so as to prepare the compound with the B—O structure.

6. The preparation method according to claim 4, comprising: mixing the compound with the B—O structure with the second solvent, then adding the 4-nitrophthalonitrile and the catalyst to form the second mixed reaction system, and reacting the second mixed reaction system for 12-18 h under a protective atmosphere and at 30-80° C., so as to prepare the hyperbranched boric acid modified phthalonitrile monomer.

7. The preparation method according to claim 4, wherein the boron source comprises boric acid and/or phenylboronic acid;
   and/or, the phenol compound comprises at least one of resorcinol, phloroglucinol, bisphenol A, bisphenol-F, and 1,3,5-pyrogallol;
   and/or, the catalyst comprises a basic catalyst; wherein, the basic catalyst comprises potassium carbonate;
   and/or, each of the first solvent and the second solvent comprises N-methylpyrrolidone.

8. The preparation method according to claim 4, wherein a molar ratio of the boron source to the phenol compound is 10:1-1:10;
   and/or, a molar ratio of the compound with the B—O structure to the 4-nitrophthalonitrile to the catalyst is 1:(1-4):(1-4).

9. A preparation method of a modified phthalonitrile resin, comprising:
provide the hyperbranched boric acid modified phthalonitrile monomer according to claim 1; and
subjecting the hyperbranched boric acid modified phthalonitrile monomer and a phthalonitrile curing agent to a curing reaction to prepare the modified phthalonitrile resin.

10. The preparation method according to claim 9, wherein the phthalonitrile curing agent comprises at least one of an organic amine curing agent, a phenolic curing agent, a strong organic acid curing agent, a strong organic acid/ammonium salt curing agent, a metal salt curing agent, and a metal curing agent.

11. The preparation method according to claim 10, wherein the organic amine curing agent comprises at least one of a 4,4'-(1,4-phenylphenoxy) dianiline curing agent, 4,4'-bis(4-aminophenoxy) diphenyl sulfone, 4,4'-bis(3-aminophenoxy) diphenyl sulfone, and 4,4'-diaminodiphenyl sulfone.

12. The preparation method according to claim 9, wherein a mass ratio of the hyperbranched boric acid modified phthalonitrile monomer to the phthalonitrile curing agent is 100:(1-30).

13. The preparation method according to claim 9, comprising: mixing the hyperbranched boric acid modified phthalonitrile monomer with the phthalonitrile curing agent and performing the curing reaction at 150-600° C.

14. A modified phthalonitrile resin prepared by the preparation method according to claim 9.

15. A preparation method of the hyperbranched boric acid modified phthalonitrile monomer according to claim 2, comprising:
reacting a first mixed reaction system containing a boron source, a phenol compound, and a first solvent to prepare a compound with a B—O structure; and
reacting a second mixed reaction system containing the compound with the B—O structure, 4-nitrophthalonitrile, a catalyst, and a second solvent to prepare the hyperbranched boric acid modified phthalonitrile monomer.

16. A preparation method of the hyperbranched boric acid modified phthalonitrile monomer according to claim 3, comprising:
reacting a first mixed reaction system containing a boron source, a phenol compound, and a first solvent to prepare a compound with a B—O structure; and
reacting a second mixed reaction system containing the compound with the B—O structure, 4-nitrophthalonitrile, a catalyst, and a second solvent to prepare the hyperbranched boric acid modified phthalonitrile monomer.

17. A preparation method of a modified phthalonitrile resin, comprising:
providing the hyperbranched boric acid modified phthalonitrile monomer according to claim 2; and
subjecting the hyperbranched boric acid modified phthalonitrile monomer and a phthalonitrile curing agent to a curing reaction to prepare the modified phthalonitrile resin.

18. A preparation method of a modified phthalonitrile resin, comprising:
providing the hyperbranched boric acid modified phthalonitrile monomer according to claim 3; and
subjecting the hyperbranched boric acid modified phthalonitrile monomer and a phthalonitrile curing agent to a curing reaction to prepare the modified phthalonitrile resin.

19. A modified phthalonitrile resin prepared by the preparation method according to claim 10.

* * * * *